July 11, 1933.　　　F. N. KALERT ET AL　　　1,917,977
COMIC STRIP DISPLAY DEVICE
Filed April 8, 1932　　2 Sheets-Sheet 1

INVENTORS.
Frank N. Kalert.
BY Joseph Suda.
ATTORNEY.

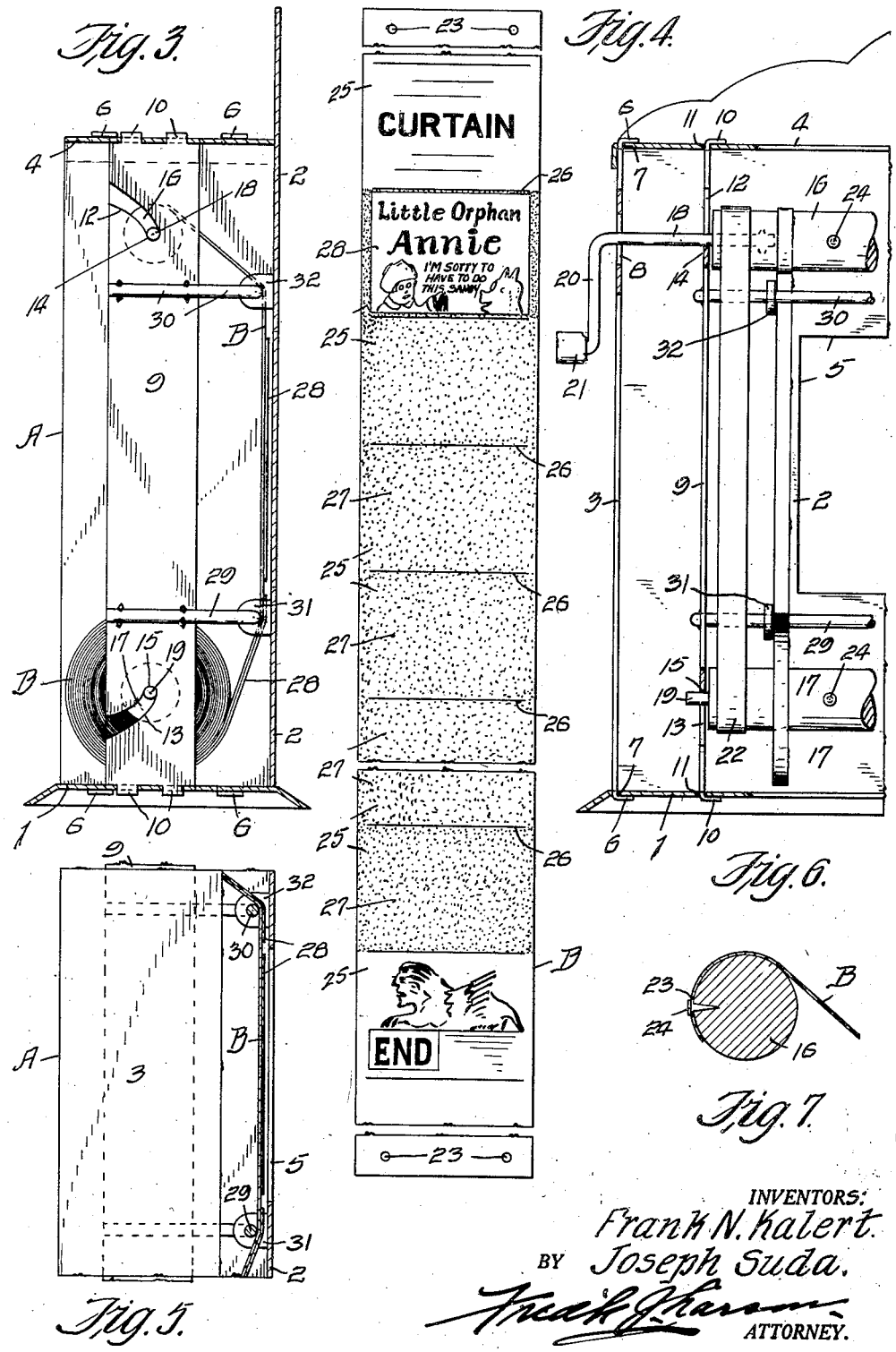

Patented July 11, 1933

1,917,977

UNITED STATES PATENT OFFICE

FRANK N. KALERT AND JOSEPH SUDA, OF ST. LOUIS, MISSOURI

COMIC STRIP DISPLAY DEVICE

Application filed April 8, 1932. Serial No. 603,960.

This invention relates to a display device, and, more particularly to a device for displaying comic strips cut from comic pages of publications.

The primary object of the invention is to provide a novel device, particularly for use by children, to display in movie fashion, comic and like strips cut from newspapers, or like publications, such comics being displayed in their successive order to be viewed through a sight opening in the device.

A further object of the invention is the provision of a device, wherein a roll of suitable flexible paper is employed to which is attached comic strip sections cut from printed publications to be viewed, one at a time, in successive order, through a sight opening in the device.

Another object of the invention is the provision of means embodying a housing and two spaced rollers, suitably connected, to which opposite ends of an adhesively coated paper strip is detachably secured, and to which paper strip a complete series of comics cut from a newspaper, or like publication, are adapted to be secured for display through a sight opening in the housing in their successive order, by the turning of one of the paper supporting rollers, so as to give a moving picture effect to the comics.

Another object of the invention resides in the provision of a housing having a front wall, so printed, as to represent the stage of a theater and an orchestra, and provided with a sight opening representative of the screen of a moving picture theater.

A still further object of the invention is the provision of a comic strip display device which possesses advantages in points of simplicity and efficiency, and at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 3 is a view partly in vertical section and partly in side elevation disclosing the features of the invention.

Fig. 4 is a plan view of the strip of unrolled ribbon paper stock adhesively coated on one face, provided with printed comic division lines and indicia indicating "Curtain", indicia indicating "End" and showing the first section of comic strip adhesively attached to the paper strip.

Fig. 5 is a sectional view of a portion of the device showing one of the comic strip sections in position back of the sight opening of the housing of the device.

Fig. 6 is a rear elevation of the device with a portion thereof broken away and certain portions thereof in section.

Fig. 7 is a detail in end view of one of the rollers, showing one end of the paper strip attached to the roller.

Figure 1:
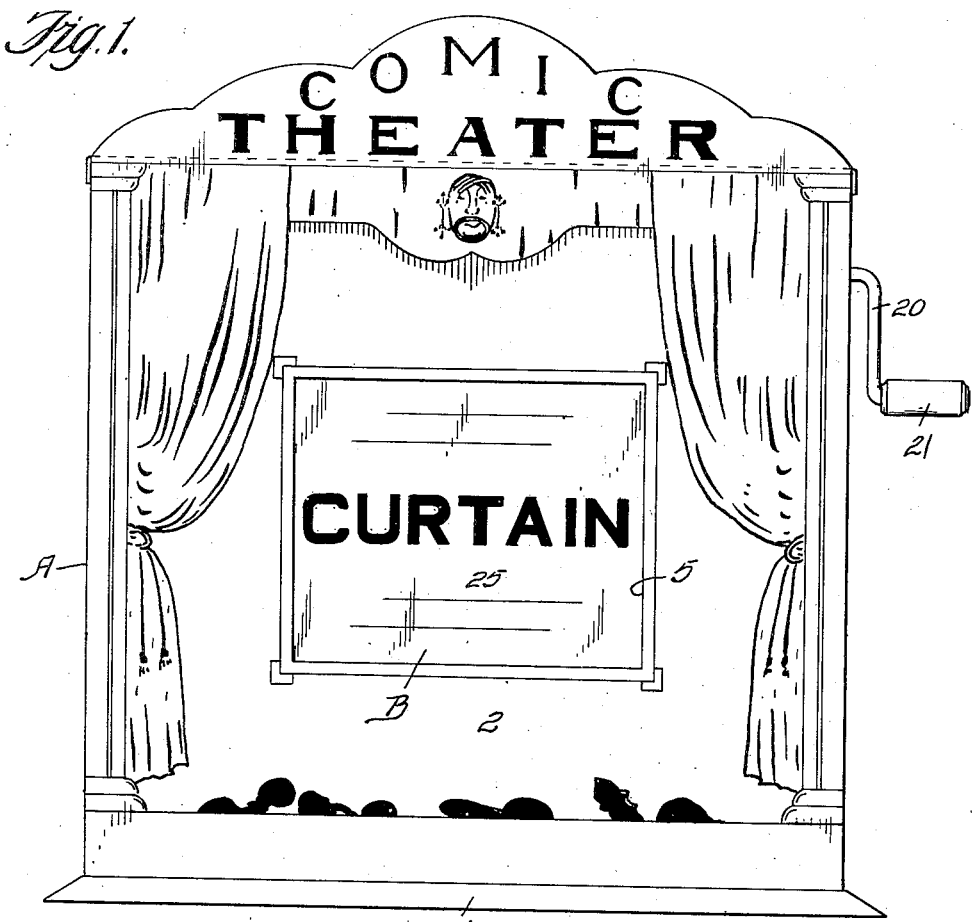
Fig. 1 is a front elevation of the comic strip display device.
Figure 2:
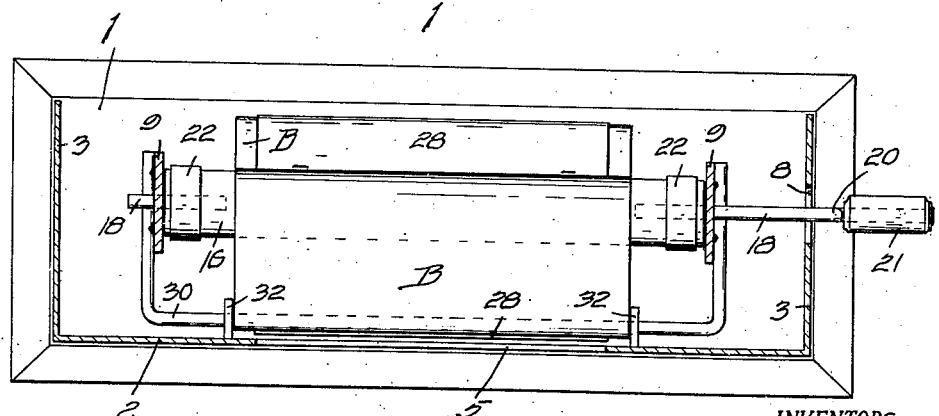
Fig. 2 is a horizontal sectional view of the device.

In carrying out the aim of the invention, we employ a suitable housing designated generally as A, and comprising a base 1, a front wall 2, the side walls 3 and the top 4. The back of the housing is open, and the front wall 2, of the housing, is provided with a suitable sight opening 5. The front wall 2 of the housing is preferably, although not necessarily so, printed to represent the stage of a theater. The sight opening 5 in the front wall is representative of the screen of a moving picture theater.

The base 1 and the top 4 are connected to the side walls 3 of the housing by means of suitable spaced fingers 6 projecting beyond the top and bottom edges of the side walls 3 and passable through openings 7 in the base and top members 1 and 4, and the fingers are bent over to engage base 1 and top 4 to lock the several housing members in position. One of the side walls 3 is provided with an opening 8, the purpose of which will be apparent hereinafter.

Disposed within the housing are a pair of suitable vertically disposed supports 9. The supports are spaced a suitable distance apart, and the upper and lower edges of the supports are provided with a plurality of suitable spaced fingers 10 projecting beyond the upper and lower edges of the supports 9, and passable through openings 11 in the base 1 and top 4, and the fingers 10 are bent over to engage the base 1 and top 4 to lock the supports against displacement.

The supports 9 are each provided with slotted passages designated 12 and 13, terminating at their inner ends in suitable bearings, designated 14 and 15, respectively. The slotted passages 12 and 13 are upper and lower passages, respectively, and they communicate with the rear edges of the supports 9. The upper slotted passages 12 in the supports are directed inwardly and downwardly from the rear edge of the supports 9, while the lower slotted passages 13 in the supports are directed inwardly and upwardly from the rear edges of the supports 9.

The reference characters 16 and 17 designate a pair of suitable rollers. The rollers are each provided at opposite ends with suitable spindles 18 and 19, respectively. The spindles 18 of the upper roller, designated 16, are journaled in the bearings 14, and the spindles 19 of the lower roller designated 17, are journaled in the lower bearings 15. A suitable crank 20 extends from one of the spindles 18 and is provided with a suitable handle 21 for manually turning the top roller 16 in either direction. The crank 20 passes through the opening 8 in one of the side walls 3 of the housing.

Connecting the rollers 16 and 17, are a pair of rubber bands 22, which bands are disposed near the ends of the rollers 16 and 17 for imparting rotary motion to roller 17 whenever roller 16 is rotated through the medium of the crank 20. The crank 20 and handle 21 are disposed to the outside of the housing, on one side thereof, as clearly shown in Figs. 1 and 6. While we have illustrated rubber bands as connecting the rollers 16 and 17, it is evident that equivalent means such as gears, or the like, may be employed for the same purpose.

A suitable strip of flexible paper, in the form of ribbon stock, is employed in connection with this device, and it is designated generally as B. This paper strip is shown in detail in Fig. 4, and it is provided at each end with a plurality of eyelets, or openings 23 for detachable connection with suitable fastening devices 24 carried in suitable spaced relation on the rollers 16 and 17.

The paper strip B is divided into a plurality of sections 25, defined by printed lines 26 running transversely of the paper strip. The first section 25 of the paper strip B, at one end thereof, is provided with the printed word "Curtain", or similar indicia, and following this in the next section 25 is the title of the comic to be shown. The last section of the paper strip is provided with the printed word "End", or similar indicia.

The sections 25 of the paper strip intermediate the title section and the end section, are reserved for the various sections of a comic, or like strip, such as appear in the comic pages of the Sunday and daily newspapers and other publications throughout the country.

The face of the paper strip B provided with the section dividing lines 26, is provided with a suitable adhesive 27, which can be moistened so that the comic strip sections, one of which is shown in Fig. 4, cut from a publication and designated 28, can be readily attached, in their successive order, to the adhesively coated face of the flexible paper strip B. As a rule, particularly in the Sunday papers, the well known comic strips usually comprise twelve sections and these sections are to be cut from the comic page and applied to the paper strip B in their successive order in the divided spaces 25 thereof.

After the comic strip in the publication has been cut into sections 28 from the publication in which they appear and applied to the paper strip B, as described, the paper strip B is attached at its lower end to the lower roller 17 by passing the fastening devices 24 thereon through the eyelets, or openings 23, at the lower end of the paper strip B, and then the paper strip B is wound upon the lower roller 17 after having removed the lower roller 17 from its bearings 15. When the paper strip B has been wound upon the lower roller 17, the lower roller is then positioned in the housing with the spindles 19 thereof journaled in the bearings 15. The lower end of the rubber bands 22 are applied to the ends of the roller 17 before it has been positioned with its spindles in the bearings 15. After the lower roller 17 has been thus positioned, the upper end of the paper strip B is drawn upwardly between a pair of spaced guide rods designated 29 and 30, and the front wall of the housing, and between side guide members 31 and 32, associated with the guide rods 29 and 30, respectively and the upper end of the paper strip B is then attached to the upper roller 16 by passing the fastening devices 24 thereon through the eyelets, or openings 23 at the upper end of the comic bearing paper strip B. The ends of the guide rods 29 and 30 are suitably connected with the upright supports 9, as clearly shown in Fig. 3.

The paper comic bearing strip having been thus positioned on the rollers 16 and 17 within the housing, the comic strip sections attached to the paper strip B are ready to be shown in their successive order through the sight opening 5 in the front wall of the housing by turning the crank 20 clockwise, causing the paper strip to be wound onto the upper roller 16. After all of the sections of the comic have been shown, in movie fashion, the crank 20 is turned anti-clockwise, and the paper strip B will then be rewound upon the lower roller 17. The lower roller can then be removed from its bearings, and another paper strip bearing comics, cut from a publication, can be applied to the lower roller 17 and shown, in movie fashion, as hereinbefore described.

If desired, paper strips B may be employed with the comics printed thereon, instead of cut from publications, and adhesively attached to the paper strip B.

From the foregoing description, it is obvious that a comic strip display device, as herein described, is attractive, interesting, educational, that it will appeal particularly to children, and that it can be used and sold either as a toy, or sold to publishers who may give them away as premiums to increase their circulation.

The many advantages of the herein described invention will readily suggest themselves to those skilled in the art to which it appertains.

From the foregoing description, it is evident that a simple device for this purpose has been disclosed, but it is to be understood that we do not desire to restrict, or limit ourselves to the very details of the construction shown and described, which is merely illustrative, it being obvious that changes, not involving the exercise of invention, may be made without conflicting or departing from the spirit of the invention within the scope of the appended claims.

What we claim is:

1. A comic strip display device comprising, in combination, a housing having a sight opening, a pair of opposed uprights within the housing, said uprights each having a pair of converging slots open to the rear edges of the uprights, a pair of rolls, trunnions on the ends of said rolls receivable in the converging slots of the uprights for rotatably supporting the rolls, endless resilient rubber bands riding over the ends of said rolls so that rotation of one of the rolls imparts like rotation to the other roll, a strip of adhesively coated flexible ribbon paper detachably secured at opposite ends to said rolls and to which is adapted to be adhesively secured a comic strip cut into individual sections to be moved in successive order past said sight opening in the housing as the paper strip is unwound from one roll onto the other roll.

2. A device of the class described, comprising, in combination, a housing having an open back and having a sight opening in the front wall thereof, and said front wall being representation of a theater stage, a pair of spaced uprights within the housing and supported at their upper and lower ends by the top and floor of the housing, said uprights having a pair of upper downwardly inclined slots arranged in opposed relation and open to the rear edges of the uprights and also having a pair of lower upwardly inclined slots arranged in opposed relation and open to the rear edges of the uprights, an upper paper strip carrying roll, trunnions on the end of said roll removably journaled in said upper pair of slots, a crank handle projecting from one of the trunnions and insertable through an opening in one of the side walls of the housing, which handle, when turned in either direction imparts rotary motion to said roll, a lower paper strip carrying roll, trunnions on the ends of said roll removably journaled in the aforesaid lower pair of slots, a pair of resilient rubber bands connecting the ends of said rolls and ridable thereon for holding the trunnions on the rolls in their respective slots and transmitting motion from the upper roll to the lower roll, a pair of paper strip guide rods spaced from and disposed to the rear of the front wall of the housing and the ends of said guide rods being fixed to the uprights.

3. In combination with a housing having a sight opening in the front wall thereof and an upper and a lower paper strip carrying roll, of a pair of spaced fixed supports disposed within the housing and each having a pair of converging slots open to the rear edges thereof, trunnions on the ends of said rolls rotatably receivable in said converging slots, endless resilient rubber means ridable over the ends of said rolls exerting sufficient tension to hold the trunnions of the lower roll in their respective slots in the supports, and said endless resilient rubber means being sufficiently expansible to permit the positioning of the rolls within the housing and the removal of the rolls therefrom while connected with said endless resilient rubber means and a crank handle projecting from one of the trunnions of the upper roll insertable and removable through an opening in one of the side walls of the housing.

4. A device of the class described comprising, in combination, a casing having an open back and having a sight opening in the front wall thereof, a pair of rolls in said casing, trunnions on the ends of said rolls, a pair of vertical supports, means connecting the ends of said supports to the top and floor of the casing, said supports each having spaced converging slots open to the rear edges of the supports for receiving the trunnions and acting as bearings therefor, endless resilient rubber members ridable over the ends of the roll and holding the trunnions on the ends thereof in the slots in said upright supports, means for rotating one of said rolls which transmits motion to the other roll through the medium of the endless resilient rubber members, an adhesively coated paper strip bearing comic strips having its ends detachably secured to said rolls and a pair of rods having their ends fixed to said supports for guiding the paper strip in its movement from one roll to the other.

In testimony whereof, we have hereunto affixed our signatures.

FRANK N. KALERT.
JOSEPH SUDA.